United States Patent
Ma (10) Patent No.: US 10,205,763 B2
(45) Date of Patent: Feb. 12, 2019

(54) METHOD AND APPARATUS FOR THE SINGLE INPUT MULTIPLE OUTPUT (SIMO) MEDIA ADAPTATION

(71) Applicant: Zhan Ma, Fremont, CA (US)

(72) Inventor: Zhan Ma, Fremont, CA (US)

( * ) Notice: Subject to any disclaimer, the term of this patent is extended or adjusted under 35 U.S.C. 154(b) by 82 days.

(21) Appl. No.: 15/249,281

(22) Filed: Aug. 26, 2016

(65) Prior Publication Data

US 2017/0064311 A1 Mar. 2, 2017

Related U.S. Application Data

(60) Provisional application No. 62/210,002, filed on Aug. 26, 2015.

(51) Int. Cl.

| | |
|---|---|
| *H04N 7/12* | (2006.01) |
| *H04L 29/06* | (2006.01) |
| *H04L 29/08* | (2006.01) |
| *G06F 13/42* | (2006.01) |
| *H04N 19/117* | (2014.01) |
| *H04N 19/159* | (2014.01) |
| *H04N 19/61* | (2014.01) |
| *H04N 19/13* | (2014.01) |
| *H04N 19/15* | (2014.01) |
| *H04N 19/513* | (2014.01) |

(52) U.S. Cl.
CPC .......... *H04L 65/60* (2013.01); *G06F 13/4282* (2013.01); *H04L 67/06* (2013.01); *H04L 69/326* (2013.01); *H04N 19/117* (2014.11); *H04N 19/159* (2014.11); *H04N 19/61* (2014.11); *H04N 19/13* (2014.11); *H04N 19/15* (2014.11); *H04N 19/513* (2014.11)

(58) Field of Classification Search
CPC ....... H04L 65/60; H04L 69/326; H04L 67/06; G06F 13/4282; H04N 19/61; H04N 19/159; H04N 19/117; H04N 19/513; H04N 19/15; H04N 19/13
USPC ...................................... 375/240.13
See application file for complete search history.

(56) References Cited

U.S. PATENT DOCUMENTS

| | | | | |
|---|---|---|---|---|
| 2012/0243601 | A1* | 9/2012 | Schmit .................. | H04N 19/61 375/240.01 |
| 2013/0125225 | A1* | 5/2013 | Candelore .............. | G06F 21/10 726/7 |
| 2014/0161174 | A1* | 6/2014 | Mohsenian ............ | H04N 19/30 375/240.02 |
| 2016/0164938 | A1* | 6/2016 | Yu ......................... | H04L 65/605 709/231 |

* cited by examiner

*Primary Examiner* — Allen C Wong (57) ABSTRACT

A method and apparatus for the single input multiple output based media adaptation is disclosed. In one embodiment, such adaption is performed in two steps. On step 1, content correlation between different compression schemes is used to perform the inter-format adaptation of a stream of a compression format to an intermediate output stream of another compression scheme with the same quality level. On step 2, content correlation between different quality levels is used to perform the intra-format adaptation of the intermediate output stream to multiple output streams at different quality levels with the same compression format. In one embodiment, content correlation is used to limit the search for mode candidates when performing both steps.

5 Claims, 7 Drawing Sheets

METHOD AND APPARATUS FOR THE SINGLE INPUT MULTIPLE OUTPUT (SIMO) MEDIA ADAPTATION

CROSS-REFERENCE TO RELATED APPLICATION

This application claims the benefit of the filing date of the following U.S. Provisional Application, which is hereby incorporated by reference in its entirety for all purposes: Ser. No. 62/210,002, filed on Aug. 26, 2015, and titled "Method and Apparatus for Smart Media Transport."

TECHNICAL FIELD

This invention relates generally to media adaptation, and more specifically to a method and an apparatus for the single input multiple output media (SIMO) adaptation.

BACKGROUND

Media adaptation is often used in the media streaming industry to deliver media content efficiently to different end users with different requirements and constraints. Given that nowadays video consumes most of Internet traffic, we hereby use video as a representative of the media of all formats. Our method and apparatus can be applied to other media formats.

To achieve the adaptation purpose, a particular media content is often prepared with different copies at different quality levels, for example, with copies having different combinations of spatial, temporal and bit rate resolutions. The existing media transport systems, including HTTP live streaming (HLS), Dynamic Adaptive Streaming over HTTP (DASH) or Motion Picture Experts Group (MPEG) media transport (MMT), are standardized to support adaptive streaming of the same content under the constraints imposed by the underlying access networks (i.e., delay, bandwidth, etc.) and the subscribed users (i.e., processing capability, user preferences, etc.).

To prepare copies of the same content at different quality levels, transcoding is commonly applied. Transcoding often includes the bit rate shaping from the high bit rate to the lower bit rate, and spatial/temporal resolution down-sampling from the Ultra High Definition to the High Definition or Standard Definition. Transcoding is also applied to adapt the content from one compression format to another (e.g., from the H.264/AVC compliant format to the HEVC compliant format), or to adapt the content within the same compression format to different quality levels.

In prior art, single input single output (SISO) adaption is typically deployed in a transcoding system. To prepare copies of the same content at different quality levels, the content has to be transcoded multiple times, one quality level at one time. In other words, to prepare copies of a content at for example 12 different quality levels, it requires transcoding of the same content for 12 times.

Our invention discloses a method and an apparatus that enables single input multiple output (SIMO) based transcoding by leveraging the content correlation between different quality levels and different compression formats.

BRIEF SUMMARY

The present principles relate to the media adaptation, and more specifically to a method and an apparatus for the single input multiple output media adaptation. Note that the H.264/AVC and HEVC compression standards are discussed below as examples to illustrate these principles. But the present disclosure is not limited to these two standards only. The present principles can be applied to other video compression technologies, standards, recommendations and extensions thereof, and may also be applied to other types and formats of video content.

In one embodiment, a method for the single input multiple output media adaptation is disclosed, where one single input media stream is transcoded to multiple output media streams having different compression schemes and different quality levels. In another embodiment, a method is disclosed that defines and uses the coding mode mapping model between different compression schemes to minimize the search of mode candidates in transcoding. In another embodiment, a method is disclosed to define and use the coding mode mapping model between different quality levels of the same compression scheme to increase the efficiency of transcoding.

DETAILED DESCRIPTION

The present principles are directed to the single input multiple output media transcoding, by leveraging the content correlation between different compression schemes and different quality levels.

The following discussions of various embodiments and the principles are by way of illustration only and should not be constructed in any way to limit the scope of the disclosure. For example, H.264/AVC and HEVC compression standards are discussed and referenced in the present disclosure as examples to illustrate the present principles but they do not limit the present disclosure in any way. Rather, the present embodiments and principles can be applied to other video compression technologies, standards, recommendations and extensions thereof, and may also be applied to other types of media content.

The single input multiple output (SIMO) media adaption enables using one media stream input to output multiple streams of different compression scheme and at different quality levels. Metadata suitable for guiding the SIMO adaptation can be encapsulated with any existing widely accepted transport system protocol, such as a MMT protocol.

Figure 1:
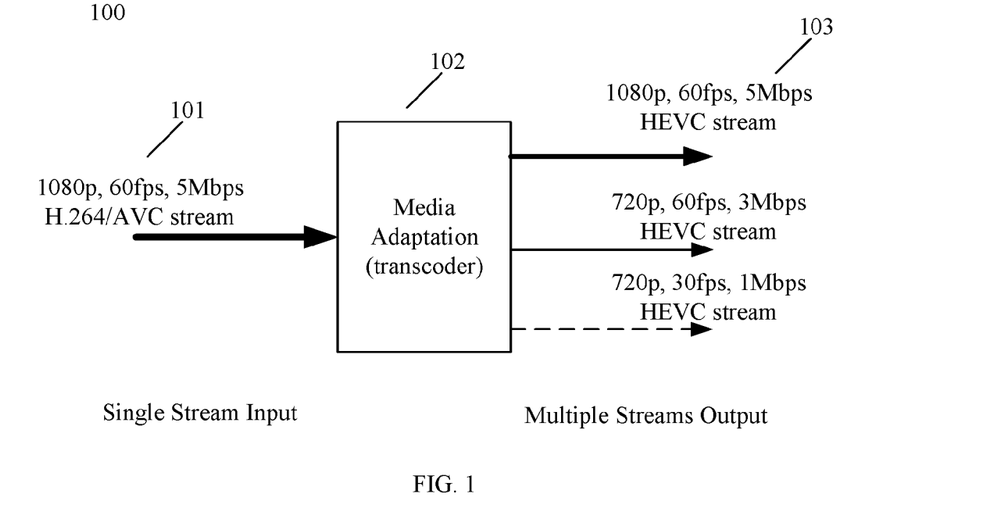
FIG. 1 is a diagram illustrating a single input multiple output media transcoding system, according to an exemplary embodiment of the present principles.

FIG. 1 illustrates an exemplary scheme for the single input multiple output adaption using one high quality input stream and outputting multiple streams at different quality levels using different compression scheme. FIG. 1 uses the popular H.264/AVC and HEVC standards as examples of applicable compression standards but the present principles can be applied to other technologies, standards, recommendations and extensions thereof.

Specifically, a high quality H.264/AVC compliant stream 101 is fed into the media adaptation device 102, which outputs multiple HEVC compliant streams 103 at different quality levels. Such high quality H.264/AVC input stream (e.g., H.264/AVC input stream having the quality level of 1080p, 60 fps and 15 Mbps) is often supplied by the broadcasting channel or captured by the camera directly. Multiple HEVC output streams of the same content (e.g., HEVC output stream with 1080p, 60 fps and 5 Mbps, or HEVC output stream with 720p, 60 fps and 3 Mbps, or HEVC output stream with 720p, 30 fps, and 1 Mbps) are typically cached in media server and requested by the users over the Internet. Due to the heterogeneous networks and user preferences, these copies of the same content with different quality levels are delivered according to the adaptive streaming protocols, such as HLS, DASH, MMT, etc.

The SIMO adaptation can be performed in two steps. The first step is the inter-format transcoding, such as transcoding a content from the H.264/AVC format to the HEVC format, with both high quality input and output streams. The second step is the intra-format transcoding: video stream having a particular compression format and a high quality level is transcoded to various output streams having the same compression format but different quality levels in order to satisfy different network bandwidth constraints and different user preferences when delivered from the media server or edge cloud to different end users.

Figure 2:
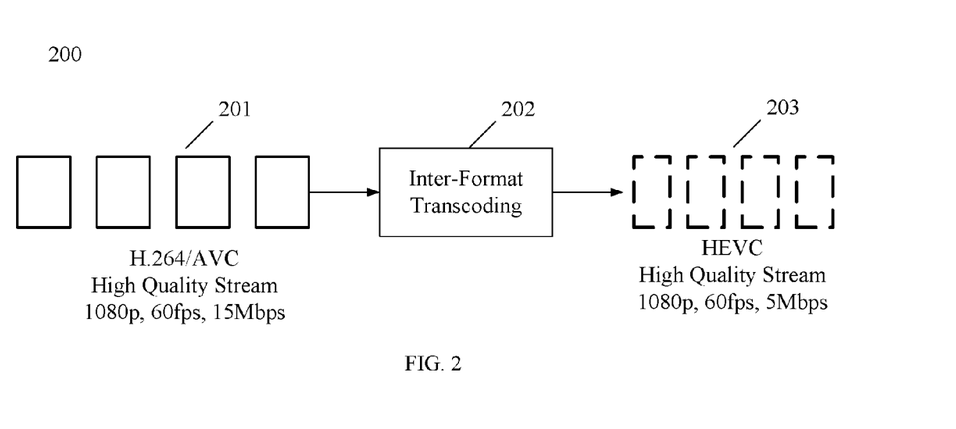
FIG. 2 is a diagram illustrating an exemplary method to adapt an H.264/AVC compliant high quality bit stream a to a high quality HEVC compliant stream, according to an exemplary embodiment of the present principles.

FIG. 2 illustrates the method 200, which is step 1 of the single input multiple output media adaption described above. The inter-format transcoding 202, such as transcoding the media content from the high quality H.264/AVC stream 201 to the high quality HEVC stream 203, is performed. Such inter-format transcoding is performed assuming the same frame rate (temporal resolution) and frame size (spatial resolution) for both input and output streams.

The inter-format transcoding 202 utilizes a coding mode mapping model between the H.264/AVC and HEVC to perform adaptation. The coding mapping model is derived based on the mode information of the same content block for the H.264/AVC and HEVC. Specifically, H.264/AVC uses a 16×16 content block (macroblock or MB) and HEVC uses a 64×64 content block (coding tree unit, or CTU). For the basic coding unit, 16 H.264/AVC MBs are grouped together to derive the appropriate mode candidates for the HEVC CTU. Without the information from the H.264/AVC MBs, transcoding an H.264/AVC stream to an HEVC stream requires conducting the brute-force search among all possible modes. Because the H.264/AVC MBs already contain necessary mode information, such as the local orientation (intra prediction directions), motion activities (motion vector), texture complexity distribution (quantized coefficients), such information can be leveraged to reduce the number of the mode candidates for the output HEVC stream. As an example, if the orientation is 45 degree based on the H.264/AVC mode information, there is no need to check other intra prediction with different prediction directions, such as 135 degree to transcode to the HEVC stream. If the motion vector is within a certain range from the H.264/AVC stream, using such information in transcoding could confine the motion search in a limited range to improve the efficiency of transcoding and reduce consumption of computing resource.

Figure 3:
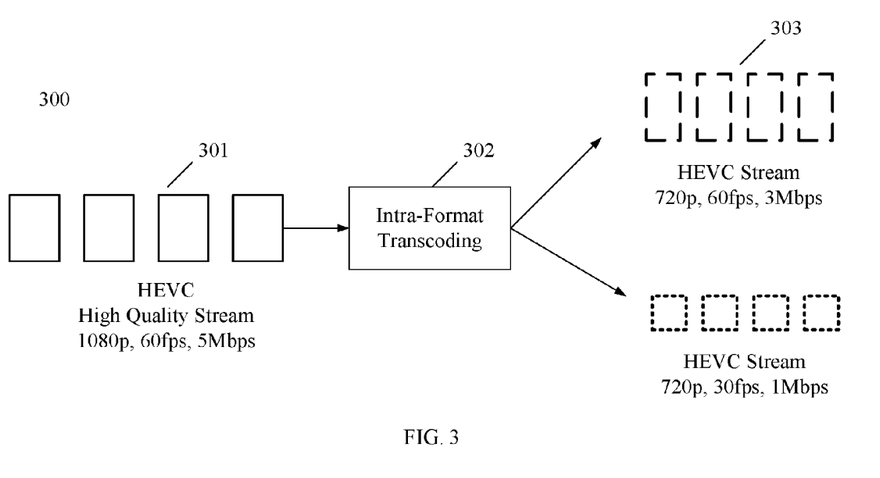
FIG. 3 is a diagram illustrating an exemplary method to adapt a high quality HEVC compliant bit stream to multiple HEVC compliant streams at different quality levels, according to an exemplary embodiment of the present principles.

FIG. 3 illustrates the method 300, which is step 2 of the single input multiple output media adaption. The intra-format transcoding 302, such as transcoding the high quality HEVC stream (i.e., 1080p, 60 fps, 5 Mbps) 301 outputted from step 1 as described above to several HEVC streams 303 with different quality levels (i.e., 720p, 60 fps, 3 Mbps or 720p, 30 fps, 1 Mbps). These output streams with different quality levels (as well as the bitrates) are used to satisfy the different network bandwidth constraints and user preferences when delivered from the media server or edge cloud to different end users.

Intra-format transcoding 302 is performed to adapt the streams using the same compression scheme or recommendations thereof (such as HEVC) from one quality level to different quality levels. Similar to the inter-format transcoding, a mode mapping model is derived leveraging the content correlation between the streams at different quality levels. For example, because larger block size is preferred at lower bit rate; the prediction orientation and motions are often reserved for the block at the same location. Thus, the input high quality stream is first transcoded to the stream with the lowest quality (i.e., smallest bit rate) with a smaller number of mode candidates. If the block depth is 2 for the input stream, the depth search will be limited to less than 2 when transcoding this stream to the one with the lowest quality. Typically, block depth search is from 0 to 4 without the prior knowledge. But with the content information from the input stream, the transcoder just need to check depth at 0, 1 and 2. Then, the qualities between them can be derived one by one with even smaller search candidate set constrained by both the high quality input stream and already transcoded lowest quality copy. If the block depth is 2 for input stream and the optimal block depth is 1 is for the transcoded stream at the lowest quality, the depth search will be constrained between depth 1 and depth 2 for the streams with the quality levels between the high quality and the lowest quality level.

Figure 4:
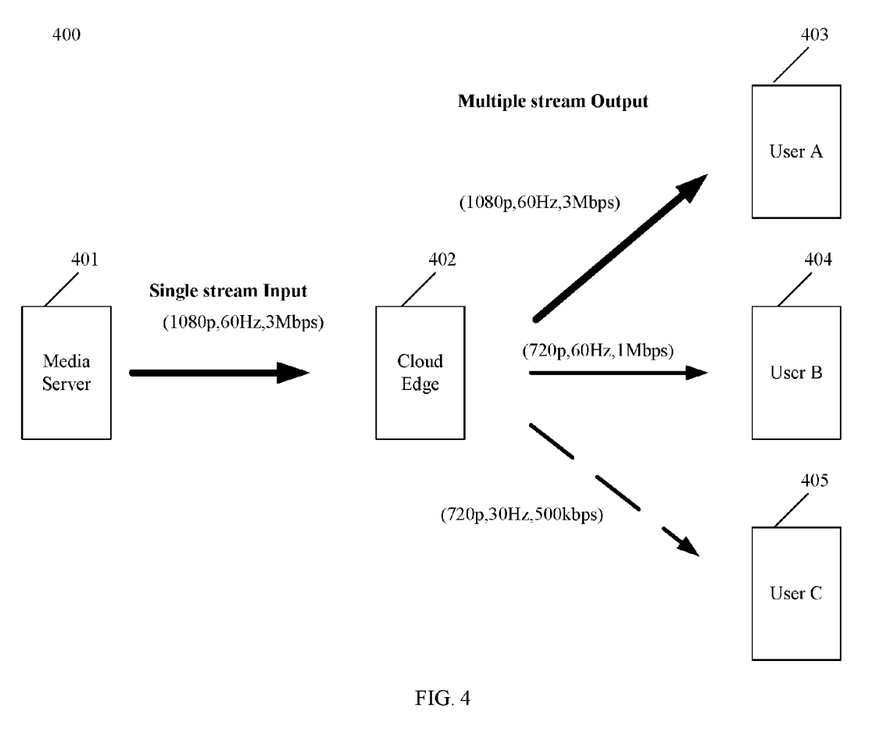
FIG. 4 illustrates an exemplary use case of a video streaming system according to an exemplary embodiment of the present principles.

FIG. 4 illustrates an exemplary use case of the presented principles of SIMO based media adaptation in a video streaming system 400. Such system 400 usually has three major components, including the media server 401, the cloud edge server 402 and multiple subscribed users (User A 403, User B 404, and User C 405 are depicted for illustration).

The media server 401 is connected with the cloud edge server 402 through available network connections (such as wired connection). The cloud edge server 402 is connected with the subscribed users 403-405 through available network connections, either wired or wireless (e.g., Wi-Fi or mobile LTE).

The present principles of SIMO media adaption can be implemented at the cloud edge 402 to support the real-time media adaptation to satisfy requests from users for video at different quality levels. With present principles, the media server only needs to deliver a single content stream to the cloud edge and the cloud edge can output video streams of the same content at different quality levels and different compression format. Because the cloud edge is typically closer to the user and it is aware of more user information, such as user's network status, device capabilities and user's preferences of quality level, the cloud edge server is better situated to determine the optimal adaptation strategy to deliver the content at the most suitable quality level and compression format.

Specifically, in the exemplary use case of FIG. 4, a single high quality content stream (i.e., 1080p, 60 Hz, 15 Mbps) is delivered from the media server 401 to the cloud edge server 402 per the requests from the users for the content. The same content may be requested by different users, who may have different requirements and constraints of quality levels and compression format. For example, user A 403 using the broadband wired network could consume the 1080p 60 Hz stream at 3 Mbps. User B 404 using the Wi-Fi could support the 720p 30 Hz stream at 1 Mbps. User C 405 using the 4G mobile network could sustain the 720p, 30 Hz stream at 500 kbps. The cloud edge server could utilize the SIMO media adaption method described above to output video streams of requested different quality levels for the users.

Figure 5:
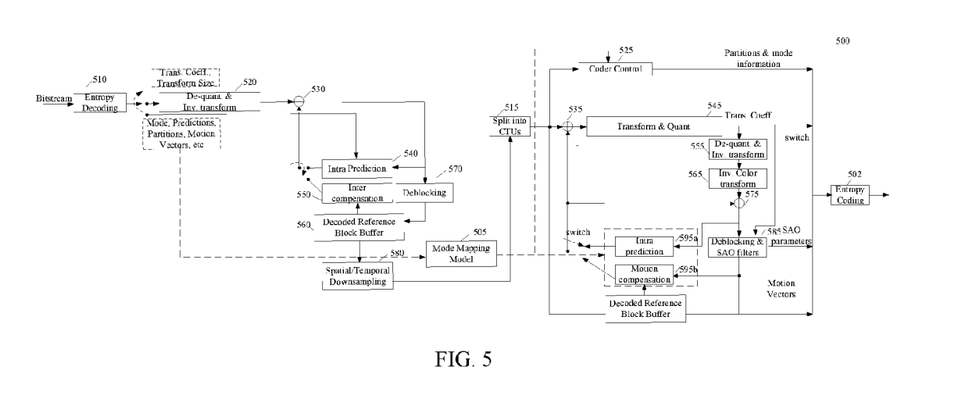
FIG. 5 a diagram illustrating one exemplary configuration of a transcoder wherein an exemplary embodiment of the present principles can be applied.

FIG. 5 illustrates an exemplary transcoder 500 wherein the present embodiments can be applied. A sequence of operations and functions according to an exemplary embodiment of the SIMO media adaption can be performed by the exemplary transcoder 500. Such operations and functions described below are illustrative of present principles of SIMO media adaption. In a particular implementation, one or more operations and functions may be excluded or additional operations and functions may be included.

Specifically, input bitstream is first entropy decoded at 510 to obtain the compressed metadata such as the mode, predictions, partitions, motion vectors (MV), transform size, quantized parameter (QP), quantized transform coefficients, etc. Dequantization and inverse transform are then performed to obtain the prediction residuals that are summed up at 530 with predictive block to reconstruct the pixels. Deblocking 570 is then used to filter the decoded pixels for better visual quality and improve the temporal prediction efficiency.

Intra prediction at 540 is applied to reconstruct the block using decoded neighbor pixels before performing the deblocking. Inter compensation 550 fetches the predictive blocks from the previous decoded and deblocked pictures in the decoded picture buffer at 560. Decoded pictures are then downsampled at step 580, if applicable for spatial/temporal adaptive transcoding. If the spatial/temporal resolution stays the same, the spatial/temporal downsampling at step 580 is skipped.

Decoded pictures from the input stream is then split into non-overlapped CTUs at 515 for encoding. Coder control 525 typically conducts the brute force search for the optimal encoding mode. Using the mode mapping model discussed above at step 505, only limited number of mode candidates are checked in the intra and inter mode decision step at 595a and 595b respectively.

Residual is obtained by subtracting the original CTU and its predictions at 535. Then transform and quantization is applied at 545 to derive the coefficients. Dequantization at 555 and inverse transform 565 are used to derive the quantized residual that are added with the prediction to get the reconstructed pictures. Filters is also applied at 585 to further improve the picture quality for display and temporal prediction.

The SIMO media adaption can be integrated into the transcoder 500 by using the spatial/temporal downsamlping at step 580 and leveraging the content correlation to derive the mode mapping model at step 505, which significantly reduce the number of the mode candidates when performing encoding.

Figure 6:
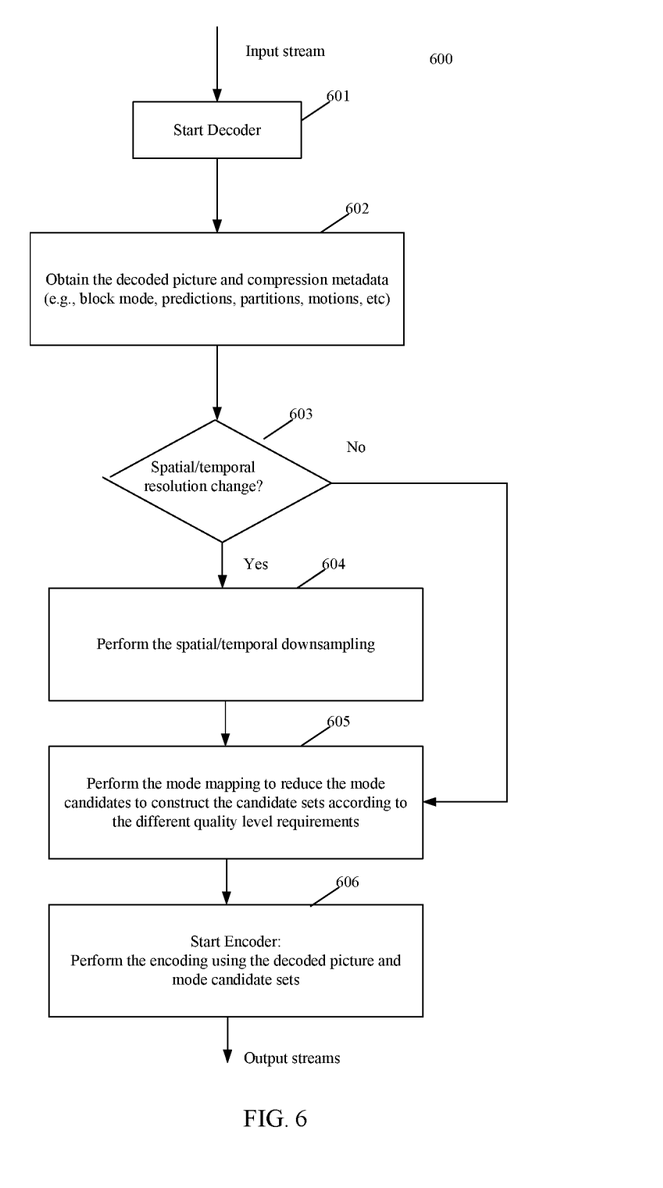
FIG. 6 is a flow diagram illustrating an exemplary method for performing the single input multiple output media adaption.

FIG. 6 illustrates an exemplary procedure 600 to perform the SIMO media adaption.

An input stream is first fed into the decoder at 601 to parse the compressed metadata such as mode, predictions, partitions, motion vectors (MV), quantized parameters (QP), quantized transform coefficients, etc. and to derive the decoded pictures at step 602. If the spatial/temporal resolution change is detected at 603, appropriate downsampling filter (e.g., bi-linear, DCT-IF, etc. for spatial downsampling, and frame dropping etc. for temporal downsampling) is performed at step 604. If the spatial/temporal resolution requires no change, it skips step 604 and proceeds to the step 605. Content correlation described above is used to construct the mode mapping at step 605, which reduces the number of mode candidates when performing encoding. Different sets of candidates will be generated according to the different requirements for different quality levels. At step 606, an encoder uses the decoded pictures from 404 or 403 and the mode candidates from 605 to produce the multiple output streams.

Figure 7:
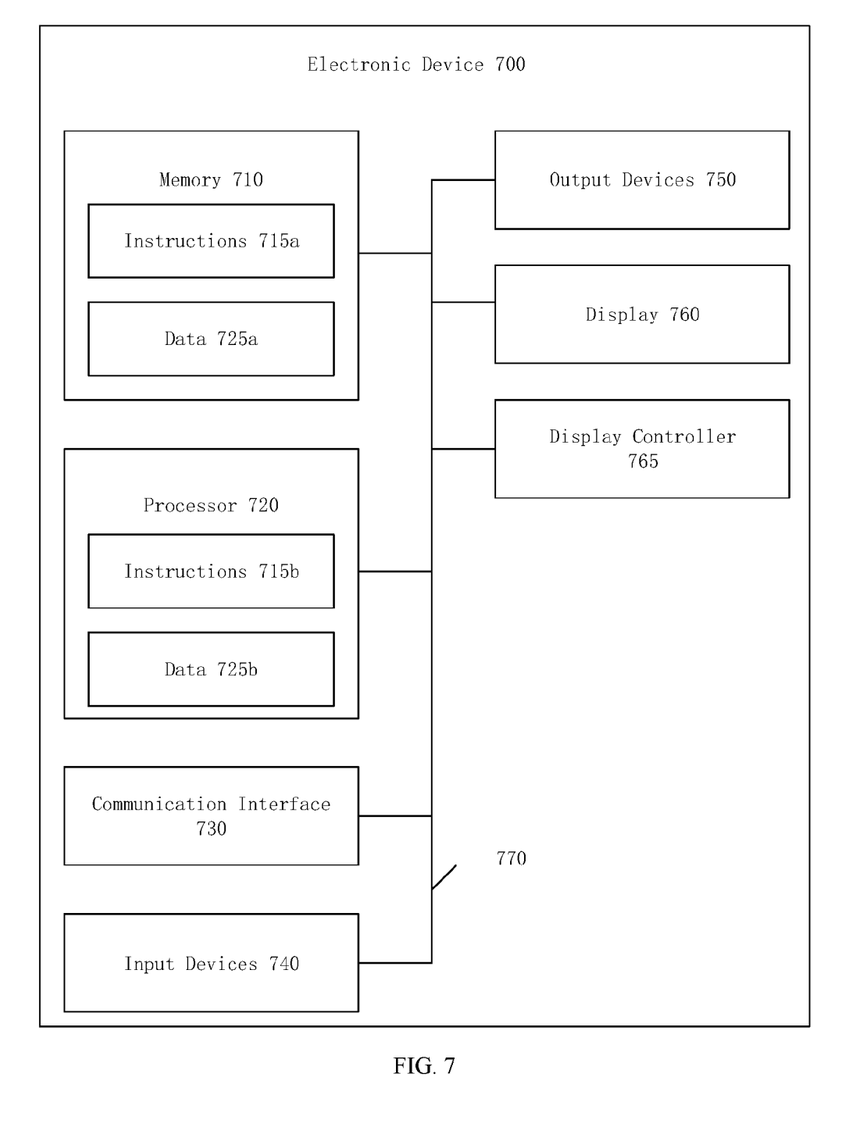
FIG. 7 is a diagram illustrating various components that may be utilized in an exemplary embodiment of the electronic devices wherein the exemplary embodiment of the present principles can be applied.

FIG. 7 illustrates various components that may be utilized in an electronic device 700. The electronic device 700 may be implemented as one or more of the electronic devices (e.g., electronic device 500) described previously and may be also implemented to practice the methods and procedures (such as methods 200, 300, 600) described previously.

The electronic device 700 includes at least a processor 720 that controls operation of the electronic device 700. The processor 720 may also be referred to as a CPU. Memory 710, which may include both read-only memory (ROM), random access memory (RAM) or any type of device that may store information, provides instructions 715a (e.g., executable instructions) and data 725a to the processor 720. A portion of the memory 710 may also include non-volatile random access memory (NVRAM). The memory 710 may be in electronic communication with the processor 720.

Instructions 715b and data 725b may also reside in the processor 720. Instructions 715b and data 725b loaded into the processor 720 may also include instructions 715a and/or data 725a from memory 710 that were loaded for execution or processing by the processor 720. The instructions 715b may be executed by the processor 720 to implement the systems and methods disclosed herein.

The electronic device 700 may include one or more communication interfaces 730 for communicating with other electronic devices. The communication interfaces 730 may be based on wired communication technology, wireless communication technology, or both. Examples of communication interfaces 730 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The electronic device 700 may include one or more output devices 750 and one or more input devices 740. Examples of output devices 750 include a speaker, printer, etc. One type of output device that may be included in an electronic device 700 is a display device 760. Display devices 760 used with configurations disclosed herein may utilize any suitable image projection technology, such as a cathode ray tube (CRT), liquid crystal display (LCD), light-emitting diode (LED), gas plasma, electroluminescence or the like. A display controller 765 may be provided for converting data stored in the memory 710 into text, graphics, and/or moving images (as appropriate) shown on the display 760. Examples of input devices 740 include a keyboard, mouse, microphone, remote control device, button, joystick, trackball, touchpad, touchscreen, lightpen, etc.

The various components of the electronic device 700 are coupled together by a bus system 770, which may include a power bus, a control signal bus and a status signal bus, in addition to a data bus. However, for the sake of clarity, the various buses are illustrated in FIG. 7 as the bus system 770. The electronic device 700 illustrated in FIG. 7 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods or approaches described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A system for adapting one input video stream into multiple output video streams using no more than one transcoder at a cloud server, comprises:

a media server that stores content, wherein said content comprising one or more videos;

a cloud server connected to the media server and configured to receive one input stream of a video stored at the media server;

wherein said cloud server comprises no more than one transcoder to transcode the input stream of the video into multiple output streams, wherein said input stream and multiple output streams having different compression formats or different quality levels;

wherein said transcoder is configured to convert the input stream of a compression format to an intermediate output stream of another compression format, wherein said input stream and intermediate output stream having a same quality level; said transcoder is further configured to transcode the intermediate output stream to the multiple output streams, wherein the multiple output streams having the same compression format as the intermediate output stream and different quality levels from the intermediate output stream;

wherein said cloud server is further configured to select one output stream of multiple output streams to deliver to a user connected to said cloud server upon a request for the video from the user and based on the information of the user;

wherein said input stream comprises mode information and said transcoder is configured to use said mode information to perform a mode mapping to limit search of mode candidates for multiple output streams.

2. The system of claim 1, wherein said information of the user comprises said user's network condition, said user's device capabilities, or said user's preferences of quality level.

3. The system of claim 1, wherein said compression formats comprise H.264/AVC, and HEVC compliant formats.

4. The system of claim 1, wherein said quality levels comprise a spatial resolution, a temporal resolution, and a bit rate.

5. The system of claim 1, wherein said transcoder comprises a decoder module to parse metadata of the input stream and to derive decoded pictures, wherein said metadata comprises mode, predictions, partitions, motion vectors (MV), quantized parameters (QP), quantized transform coefficients; said transcoder further comprises a module configured to apply appropriate downsampling filters to change the quality level of the input stream; said transcoder further comprises a module to construct the mode mapping to reduce the number of mode candidates; said transcoder further comprises an encoder module to encode multiple output streams based on the decoded pictures and the mode candidates.

* * * * *